Figure 1:
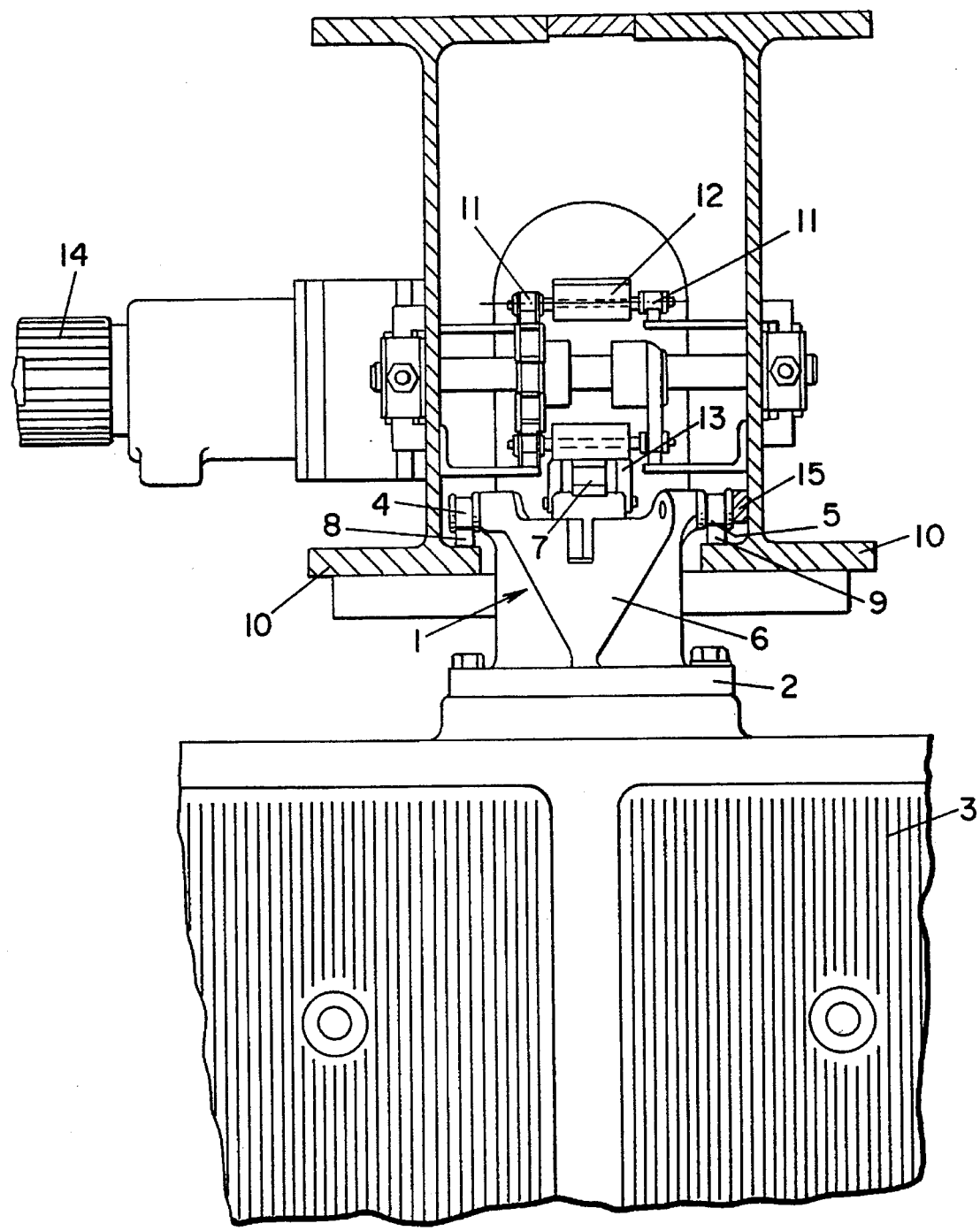

United States Patent [19]

Fresenius et al.

[11] Patent Number: 5,462,663
[45] Date of Patent: Oct. 31, 1995

[54] SUSPENSION AND GUIDANCE MECHANISM FOR THE FILTER PLATES OF A FILTER PRESS

[75] Inventors: Jürgen Fresenius, Bad Schwalbach; Fritz Gebhardt, Runkel, both of Germany

[73] Assignee: Passavant-Werke AG, Germany

[21] Appl. No.: 154,003

[22] Filed: Nov. 18, 1993

[30] Foreign Application Priority Data

Nov. 19, 1992 [DE] Germany ............ 42 39 005.2

[51] Int. Cl.⁶ .................................. B01D 25/172
[52] U.S. Cl. ..................... 210/230; 210/236; 100/199
[58] Field of Search ............................ 210/230, 236; 100/199; 105/155

[56] References Cited

U.S. PATENT DOCUMENTS

| | | | |
|---|---|---|---|
| 4,295,970 | 10/1981 | Oelbermann et al. | 210/230 |
| 4,461,705 | 7/1984 | Gehrmann | 210/225 |
| 4,623,453 | 11/1986 | Davenport | 210/143 |
| 4,764,273 | 8/1988 | Heinrich et al. | 210/225 |

FOREIGN PATENT DOCUMENTS

| | | |
|---|---|---|
| 0234506 | 9/1987 | European Pat. Off. . |
| 1144689 | 3/1963 | Germany . |
| 2012078 | 3/1970 | Germany . |
| 2618437 | 11/1977 | Germany . |
| 7631859 | 9/1978 | Germany . |
| 2920385 | 11/1980 | Germany . |
| 3025733 | 1/1982 | Germany . |
| 3606301 | 9/1987 | Germany . |
| 3606302 | 9/1987 | Germany . |
| 9109040 | 10/1991 | Germany . |
| 638106 | 9/1983 | Switzerland . |
| 424502 | 2/1935 | United Kingdom . |

*Primary Examiner*—Matthew O. Savage
*Attorney, Agent, or Firm*—Larson and Taylor

[57] ABSTRACT

In a suspension and guidance mechanism for the filter plates of a filter press, where the dollies (1) that carry filter plates (3), each dolly with two rollers (4, 5) that are staggered with respect to each other in the direction of movement and are positioned on two rails (8, 9), and that move along the rails by a transport device located between the running rollers, the derailment of the dollies is prevented in that, laterally, next to the rollers (5) that move in the direction of transport, there is a guide bar (15) or that these rollers (5) have an enlarged wheel flange (16), whereby the height of the guide bar (15) or of the wheel flange (16) is greater than the lifting movements of the roller (5) away from rail (9), caused by plate adhesion during the acceleration of the dollies.

3 Claims, 2 Drawing Sheets

SUSPENSION AND GUIDANCE MECHANISM FOR THE FILTER PLATES OF A FILTER PRESS

DESCRIPTION

This invention relates to a suspension and guidance mechanism for the filter plate of a filter press, with two parallel rails, and with dollies that can be moved on them by means of rollers and on which the filter plates are suspended, with each dolly having one roller that runs on each rail, and, between them, an engagement element for the engagement of a transport device that moves the dolly along the rails in the opening direction of the filter press, and the two rollers of each dolly are staggered with respect to each other in the longitudinal direction of the rails. A mechanism of this kind is known, for example, from DE-A [Published German Patent Application] 36 06 301.

The filter plates must be pushed together to form a package; this is why the dollies must also be made so that, when they are pushed together, they will not take up any more space in the longitudinal direction of the rails than would correspond to the thickness of the filter plates. For space reasons, therefore, each dolly can have only one roller on each rail.

When these rollers are arranged coaxially, then the dolly, and with it the filter plate, essentially swings freely around the axis of the rollers. To prevent this kind of pendulum motion as much as possible, the two rollers of each dolly are staggered with respect to each other in the longitudinal direction of the rails, so that the weight of the perpendicularly suspended filter plate will already generate a torque with respect to each roller, which will counteract the pendulum oscillations.

When the filter press is opened, the dollies are grasped in succession by the transport device, and, together with the filter plates suspended on them, they are accelerated in the opening direction, whereby the inertial force of the filter plate and the adhesion of the filter plate to the filter cake must be overcome. The result of these forces generates a torque around the front roller in the direction of movement, and this torque lifts the following roller upward, away from the rail. A certain lifting motion by the following roller, off the rail, which corresponds to a certain lag of the filter plate when compared to the dolly, is desirable because that causes the acceleration of the filter plate to start more gently, and because one can in this way prevent excessively high acceleration forces that would stress the dolly and its connection to the filter plate too much. This is why proposals aimed at completely eliminating the lifting of the rollers off their rails by force-guidance rails arranged above the rollers proved to be impractical.

But it was found that, during the operation of such filter presses, there can be operational breakdowns, such as dollies being "derailed" during the opening of the filter press, that is, the dollies become jammed with respect to the rails and then they no longer continue to roll smoothly on the rails into the opening position. Such jammed dollies nevertheless are pulled all the way to the opening position by the transport device, which can lead to increased wear and tear, and even damage to the mechanism; an attendant must then manually realign them properly on the rails; depending on the weight of the filter plates, this is a strenuous process and, above all, it is not compatible with the demand for the fully automatic operation of the filter press.

The purpose of this invention is the design of a mechanism of the kind mentioned that can prevent the derailment of the dollies during the opening of the filter press.

In a first solution according to the invention, this is achieved when, next to the rail for the rollers of the dollies that move in the opening direction, there is a guide bar that touches the outside of the roller or that is opposite it with a small gap, and whose height is greater than the upward lift-off movement of the roller, caused by plate adhesion. The guide bar preferably consists of a low-friction material, such as, for example, plastic.

In another solution according to the invention, the roller that moves in the opening direction has, on its inner side, a wheel flange whose height is greater than the upward lift-off movements of the roller, caused by plate adhesion.

The drawing will explain a practical version of the invention in greater detail.

Figure 2:
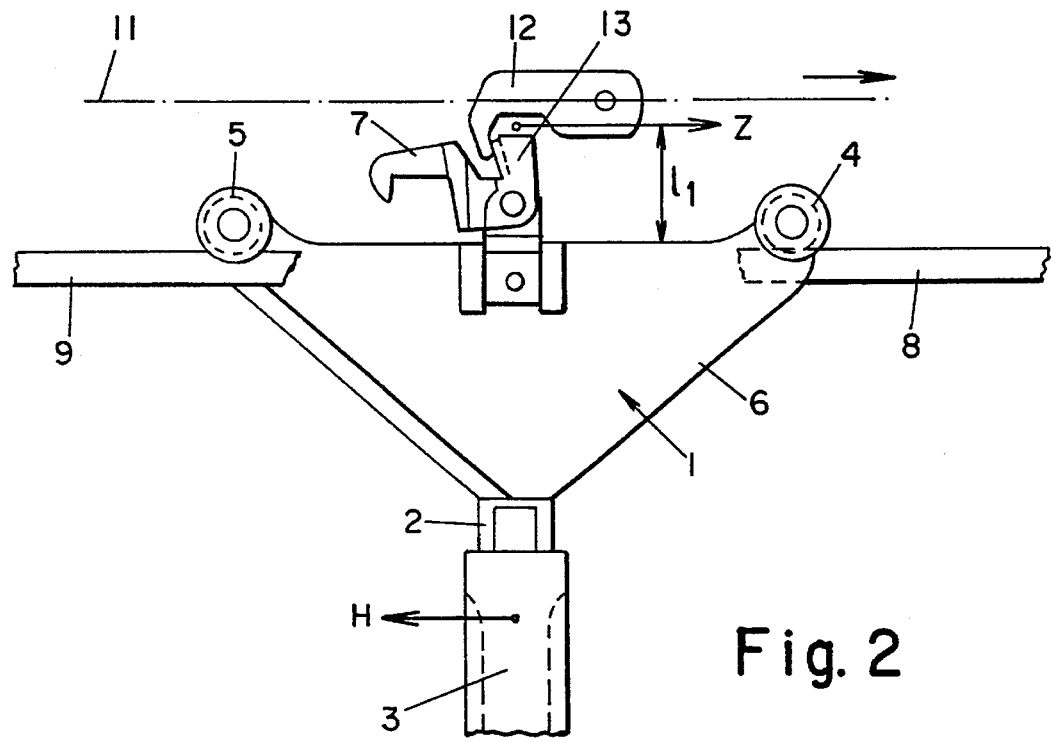
Figure 3:
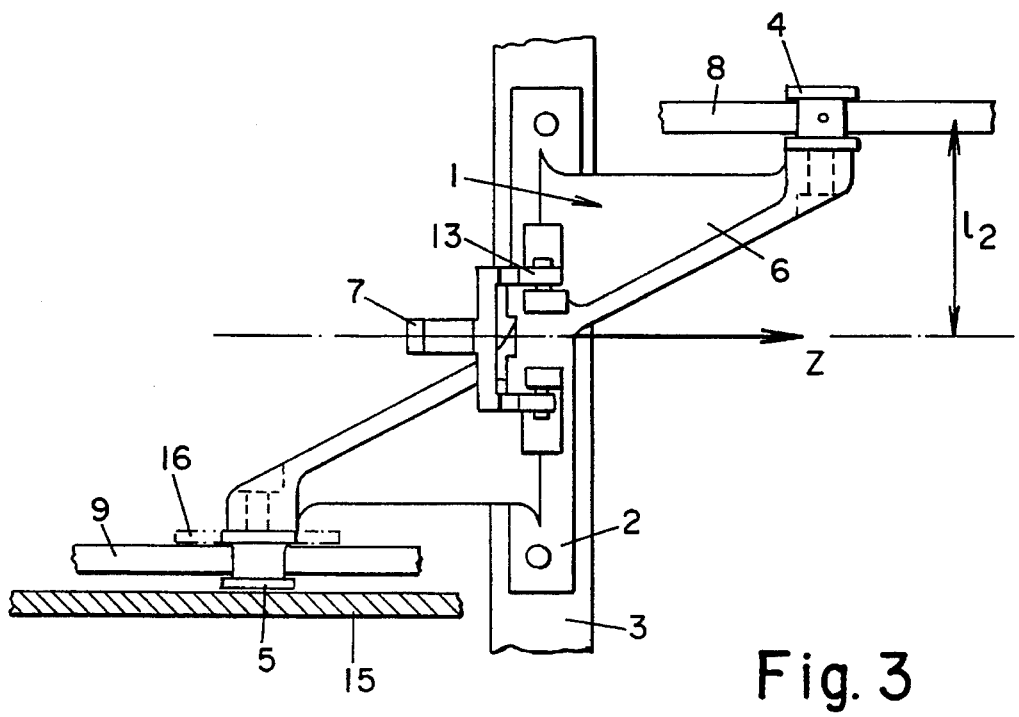

FIG. 1 the front view of the suspension and guidance mechanism, partial cross-section, lateral with respect to the direction of transport;

FIG. 2 side view of a dolly:

FIG. 3 top view of the dolly shown in FIG. 2.

Dolly 1, shown particularly in FIGS. 2 and 3, is connected via a foot bar 2, with a filter plate 3, of which only the upper area is shown. The upper part of each dolly 1 is made as a slanted plate 6, arranged at an angle with respect to the plane of the filter plate, and that slanted plate has, at its ends, one bearing for each roller 4 or 5, by means of which dolly 1 can roll on two rails 8, 9. By means of this special design of dolly 1, the dollies of neighboring filter plates can be pushed together as closely as would correspond to the thickness of the filter plates 3, although rollers 4, 5, for the reasons mentioned initially, are staggered with respect to each other by a considerably greater degree in the longitudinal direction of rails 8, 9.

As one can see in FIG. 1, rails 8, 9 are supported by a carrying section piece 10. The latter also envelops the transport mechanism that is used to move the dollies with the filter plates. This transport mechanism has a pair of endless chains 11 that are attached to corresponding chain wheels and that are driven by a motor 14, and to which are attached transport catches 12 at regular intervals. Each transport catch 12, as shown in FIG. 2, works together with a driving plate 23, positioned on dolly 1. Preferably, driving plate 13 is connected with a locking catch 7 that is positioned on dolly 1 so that it cannot swing freely, and with which the dolly can be locked together with the next dolly that moves in a first direction of opening. As a transport catch 12 engages driving plate 13, locking catch 7 swings upward, and, as a result, the locking action with the next dolly is eliminated; only then is traction force Z of the transport catch 12 transmitted to dolly 1, and the latter is then accelerated to the right, together with the filter plate 3, as shown in FIG. 2.

Counteracting this traction force Z, which acts on driving plate 13 and thus at a level $1_1$ over rails 8, 9, is a counterforce H that acts on the filter plate, and that counterforce H is caused partly by the mass inertia of filter plate 3 and partly by its adhesion to the filter cake. The two forces Z and H generate a torque around the axis of front roller 4 in the direction of movement, and that torque lifts the rear roller 5 off its rail 9. Once roller 5 has lost its guidance along rail 9, traction force Z, which, according to FIG. 3, acts at a lateral interval $1_2$ from rail 8, causes a torque around a vertical axis running through the forward roller 4, as a result of which the following roller 5 is shifted outward (that is, downward, as in FIG. 3) with respect to rail 9. After the adhesion and acceleration force H has ceased, and after the following roller 5 has been lowered again, it no longer properly hits rail 9, but instead is staggered laterally with respect to rail 9.

To prevent this, a guide bar 15 having a guide surface is placed proximate to roller 5 and parallel to rail 9; this guide bar touches a free axially outer surface of roller 5 or is opposite it with a small gap. The vertical interval between the upper edge of this guide bar 15 and rail 9 is so great that roller 5, even if it is lifted upward, and away from rail 9 due to adhesion force H, will not lose its lateral guide along the guide bar, and therefore cannot be pushed outward laterally with relation to rail 9. Guide bar 15 preferably consists of a low-friction and low-wear material, such as, for example, polyethylene or some other synthetic substance.

According to another version of the invention, shown by the broken lines in FIG. 3, roller 5 on the inside of rail 9 is provided with a wheel flange 16 that protrudes so far over the circumferential surface of the roller that roller 5 will not lose its lateral guidance along the inner side of rail 9, even as a result of the lift-off movements away from rail 9, caused by adhesion force H. This enlarged wheel flange 16 thus performs the same function as guide bar 15.

We claim:

1. A filter press comprising:

first and second parallel rails;

a carrying section piece for supporting said first and second parallel rails such that there is a longitudinal space therebetween;

a transport device positioned above and intermediate said first and second parallel rails, said transport device having at least one transport catch and means for moving the transport catch in a first direction longitudinally of said rails;

a plurality of dollies extending between said first and second parallel rails in said longitudinal space, each of said dollies having first and second rollers running on an upper surface of said first and second rails, respectively;

said first and second rollers being staggered longitudinally of said rails such that the first roller is a leading roller and the second roller is a trailing roller with respect to said first direction, wherein said rollers each have a free axially outer surface facing laterally and outwardly away from said rails;

a plurality of filter plates, each of said filter plates being rigidly suspended below said rails from a respective dolly;

an engagement element positioned on each of said dollies between said first and second roller for engagement by said transport catch, whereby a transport movement of the dollies in said first direction is effected, said trailing roller having freedom for upward vertical motion away from the second rail in response to forces acting on the filter plate carried by said dolly during said transport movement; and a guide bar having a guide surface extending parallel to said second rail and positioned proximate the free axially outer surface of said trailing roller, said guide surface and having a sufficient height for contacting the free axially outer surface of said trailing roller to prevent said trailing roller from lateral movement outwardly away from the second rail during said upward vertical motion.

2. The suspension and guidance mechanism according to claim 1 wherein the guide bar consists of a low friction material.

3. The suspension and guidance mechanism according to claim 2 wherein the low friction material consists of plastic.

\* \* \* \* \*